June 11, 1968  R. E. KING ET AL  3,388,209
FEEDER BUS DUCT HAVING PROVISION FOR POWER TAP-OFF DEVICE
Filed Dec. 8, 1966  4 Sheets-Sheet 1
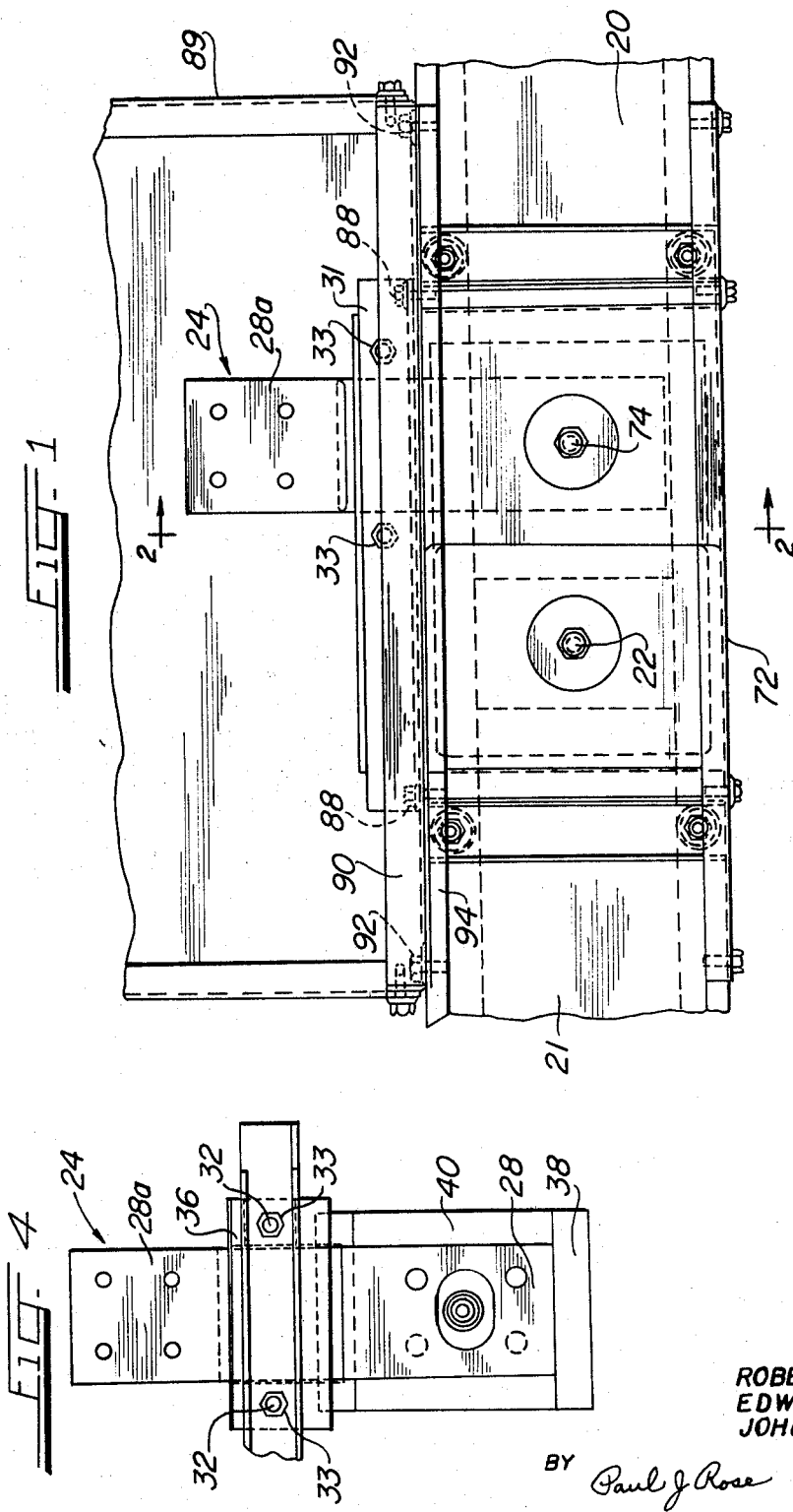
INVENTORS
ROBERT E. KING
EDWIN N. COBB
JOHN E. SCHMIDT
BY Paul J Rose

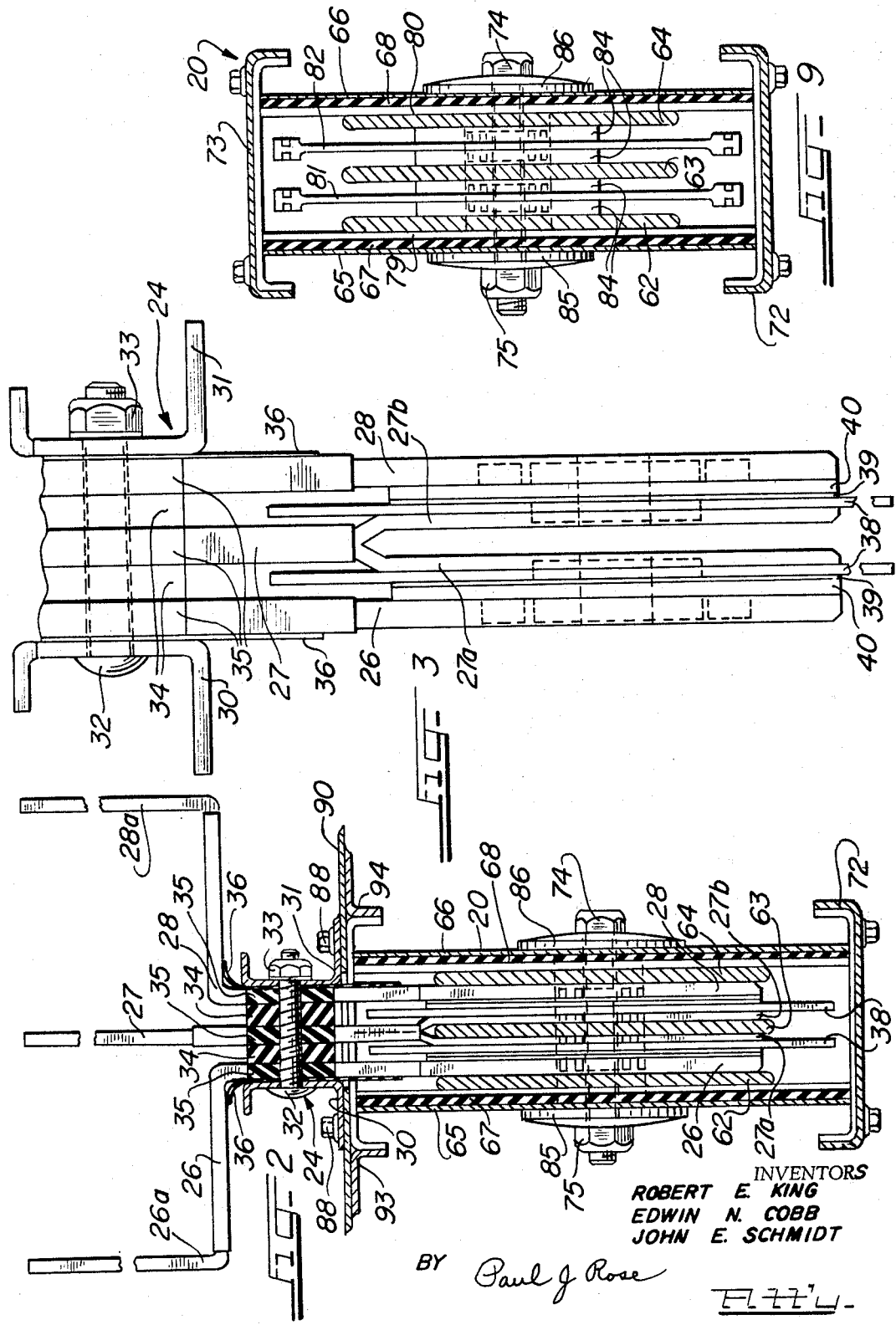

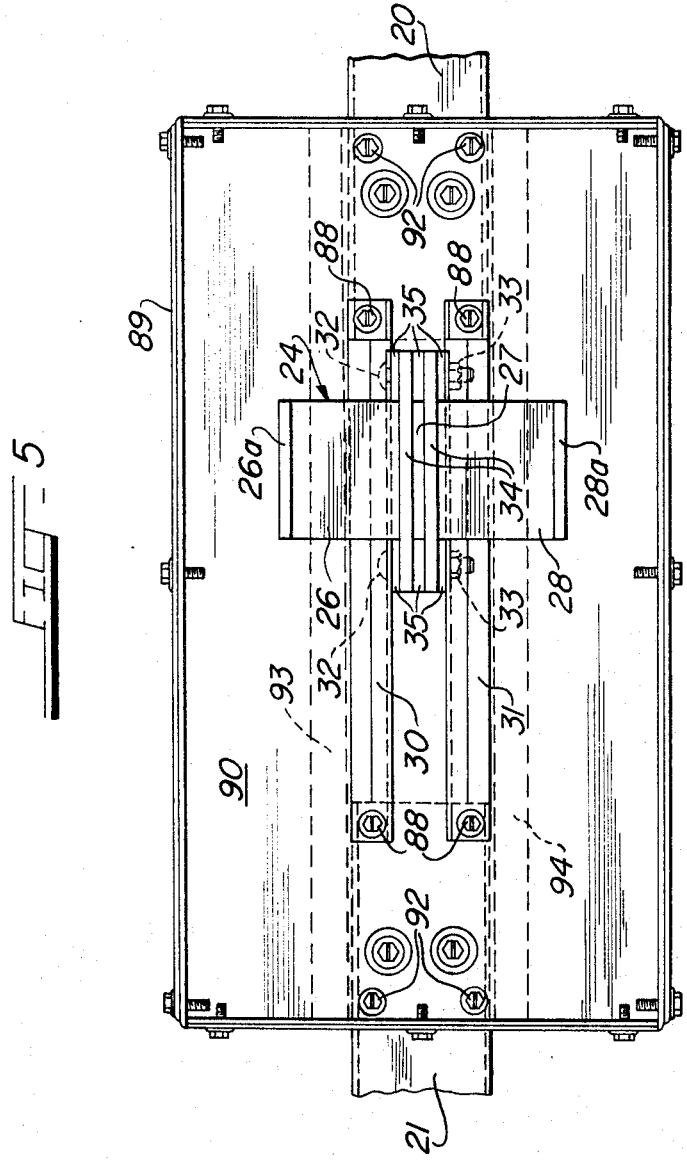

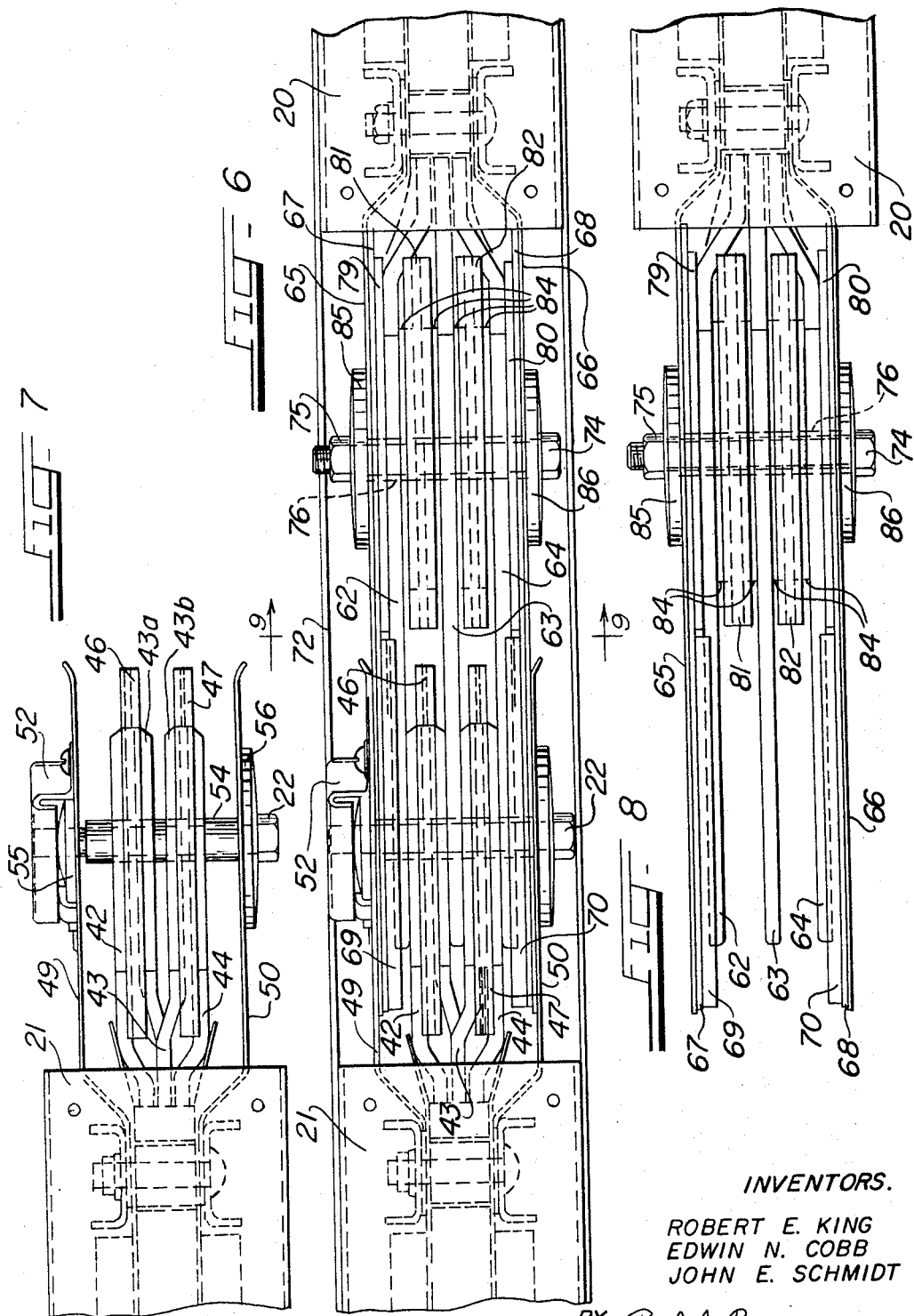

United States Patent Office 3,388,209
Patented June 11, 1968

1

3,388,209
FEEDER BUS DUCT HAVING PROVISION FOR POWER TAP-OFF DEVICE
Robert E. King, Park Ridge, Ill., and Edwin N. Cobb and John E. Schmidt, Lexington, Ky., assignors to Square D Company, Park Ridge, Ill., a corporation of Michigan
Filed Dec. 8, 1966, Ser. No. 599,458
6 Claims. (Cl. 174—71)

ABSTRACT OF THE DISCLOSURE

A bus duct section of the feeder type having a plurality of flat bus bars of equal thickness disposed in flatwise parallel relationship to each other and spaced from each other less than the thickness of a bus bar, opposite end portions of at least the two outer bus bars being outwardly offset to accommodate interleaving with the bus bars of another bus duct section in the formation of a joint, and provision being made for installation of a power tap-off device adjacent one end of the bus duct section in a portion thereof containing the outwardly offset end portions of the two outer bus bars.

Field of the invention

An electrical conductor comprising an assembly of bus bars encased in a housing for use as a feeder duct and having means for connecting branches.

Descripton of the prior art

Prior to this invention, either there was no provision for installing a power tap-off device in an existing feeder bus duct system, or else special relatively short sections of feeder bus duct having power tap-off accommodation means centrally disposed longitudinally thereof had to be included at selected locations in the system at the time of the original installation.

Summary of the invention

The feeder bus duct section of this invention as furnished in standard lengths by the manufacturer may be connected to other identical bus duct sections in a feeder bus duct system at the time the system is installed, and may also be modified after installation in a system to accept a power tap-off device adjacent one end of the bus duct section. Thus a power tap-off device may always be installed, but it is not necessary to include, in the system as originally installed, special relatively short sections of feeder bus duct having power tap-off accommodation means centrally disposed longitudinally thereof.

The feeder bus duct section of this invention includes a plurality of flat bus bars disposed in flatwise parallel closely spaced relationship, the outer two bus bars having outwardly offset end portions interleavable with corresponding bus bars of a second feeder bus duct section, and the outwardly offset end portions having a length sufficient to accommodate the bus bars of a power tap-off device next to the joint between the two bus duct sections.

Brief description of the drawings

FIG. 1 is a fragmentary side view showing the joined end portions of two feeder bus duct sections constructed in accordance with the invention and a power tap-off device installed in the right-hand one of the bus duct sections, a side panel of a box surrounding the power tap-off device having been removed;

FIG. 2 is an enlarged fragmentary sectional view taken generally along the line 2—2 of FIG. 1;

FIG. 3 is an enlarged fragmentary end view of the power tap-off device of FIG. 1 before installation thereof in a feeder but duct section;

2

FIG. 4 is a fragmentary side view of the power tap-off device of FIG. 1 before installation thereof in a feeder bus duct section;

FIG. 5 is a fragmentary top view of the two feeder bus duct sections, the power tap-off device, and the box of FIG. 1;

FIG. 6 is a fragmentary top view showing the joined end portions of the two feeder bus duct sections of FIG. 1, but illustrating the right-hand one of the bus duct sections of FIG. 1 as it would be used without the power tap-off device of FIGS. 1 through 5 installed therein, an upper tie channel being omitted;

FIGS. 7 and 8 are fragmentary top views respectively showing the end portions of the feeder bus duct sections of FIG. 6 before they are joined; and FIG. 9 is a sectional view taken generally along the line 9—9 of FIG. 6, but including an upper tie channel.

Description of the preferred embodiment

FIGS. 1 and 5 fragmentarily show a pair of identical feeder bus duct sections 20 and 21 constructed in accordance with the invention. The duct sections 20 and 21 are shown connected together, only the connected end portions being shown. Thus, as viewed in FIGS. 1 and 5, the left-hand end portion of the duct section 20 and the right-hand end portion of the duct section 21 are shown. As manufactured, the duct sections 20 and 21 are each about ten feet long, it being understood that the duct section 20 has a right-hand end portion identical to the illustrated right-hand end portion of the duct section 21, and the duct section 21 has a left-hand end portion identical to the illustrated left-hand end portion of the duct section 20.

The general construction of the duct sections 20 and 21 is as described in U.S. Patent No. 3,187,086, to which reference may be had for further details. The right-hand end portion of the duct section 21 and the joint between the duct sections 20 and 21 are as described in U.S. Patent No. 3,189,680. Thus, the duct sections 20 and 21 are connected by a single-bolt joint including a bolt 22. The present invention is directed to an improvement in the structure of the above patents as illustrated by the left-hand end portion of the duct section 20, the improvement permitting the installation of a power tap-off device 24 (FIGS. 1 through 5) in the left-hand end portion of the duct section 20 next to the joint between the duct sections 20 and 21.

The power tap-off device 24 includes three flat tap-off bus bars 26, 27, and 28, the two outer bus bars 26 and 28 having oppositely offset outer end portions 26a and 28a as best shown in FIG. 2 and the center bus bar 27 having a forked inner end portion including fork portions 27a and 27b, as best shown in FIG. 3. The bus bars 26, 27, and 28 are clamped at intermediate portions thereof between a pair of elongated, generally channel-shaped brackets 30 and 31, the clamping force being applied by a pair of bolts 32 provided respectively with a pair of nuts 33. The bus bars 26, 27, and 28 are taped at their intermediate portions as best shown in FIGS. 2 and 3 and are further insulated by a pair of elongated insulators 34 extending between respective pairs of the bus bars beyond opposite edge portions thereof as best shown in FIG. 5. Six generally square insulators 35 are provided, opposite end portions of the insulators 34 being interleaved therebetween. As best shown in FIGS. 2 and 4, a pair of flexible insulation sheets 36 are provided respectively between the bus bars 26 and 28 and the respective brackets 30 and 31.

As best shown in FIGS. 3 and 4, three pairs of insulators 38, 39, and 40 are provided on the inner end portions of the bus bars 26, 27, and 28, one of each of the insulators 38, 39, and 40 being disposed between the bus bar 26 and the fork portion 27a and one of each of the insulators 38, 39, and 40 being disposed between the bus bar 28 and the fork portion 27b. The insulators 38, 39, and 40 are trapped in place by suitable bosses on the insulators received in suitable holes in the bus bars.

FIGS. 1, 2, and 5 show the power tap-off device 24 installed on the duct section 20. To better understand the installation of the power tap-off device 24, however, reference should first be had to FIGS. 6 through 9. FIGS. 6, 8, and 9 show the left-hand end portion of the duct section 20 in condition for use without the power tap-off device 24, while FIG. 7 shows the right-hand end portion of the duct section 21.

The duct section 21 includes three flat bus bars 42, 43, and 44 (FIG. 7) of equal thickness arranged in flatwise parallel relationship and spaced from each other less than the thickness of one of the bus bars for the greater portion of the length of the duct section 21, in the same manner as are the bus bars in the structure disclosed in U.S. Patent No. 3,187,086. In the right-hand end portion of the duct section 21, the right-hand end portions of the bus bars 42 and 44 are oppositely and outwardly offset, and the end portion of the bus bar 43 is split longitudinally of the bus bar to form two separate split end portions 43a and 43b which are also oppositely offset, in the same manner as more fully disclosed in U.S. Patent No. 3,189,680. A pair of insulators 46 and 47 are trapped respectively between the bus bar 42 and the split end portion 43a, and between the split end portion 43b and the bus bar 44. The right-hand end portion of the duct section 21 is provided with a pair of spaced joint covers 49 and 50, the joint cover 49 having a nut holder 52 secured thereto and containing a nut (not shown) for the bolt 22. The bolt 22 is captive in the bus bars 42, 43, and 44 and the joint covers 49 and 50 and is provided with an insulating sleeve 54 disposed between the joint covers 49 and 50 and a pair of spring washers 55 and 56 disposed respectively on the outside of the joint covers 49 and 50.

The duct section 20 includes three flat bus bars 62, 63, and 64 (FIG. 8) of equal thickness arranged in flatwise parallel relationship and spaced from each other less than the thickness of one of the bus bars for the greater portion of the length of the duct section 20. In the left-hand end portion of the duct section 20, the left-hand end portions of the bus bars 62 and 64 are oppositely and outwardly offset, but the left-hand end portion of the bus bar 63 is aligned with the main portion of the bus bar 63. The length of the offset portions at the left-hand ends of the bus bars 62 and 64 is about twice as great as the length of the corresponding offset portions of the bus bars in U.S. Patents Nos. 3,187,086 and 3,189,680.

The complete bus bars 42, 44, 62, and 64 are identical with each other, although the bus bars 44 and 64 are reversed respectively from the bus bars 42 and 62, and the complete bus bars 43 and 63 are identical with each other.

The left-hand end portion of the duct section 20 is provided with a pair of spaced joint covers 65 and 66 having a pair of insulators 67 and 68 secured respectively to the inner surfaces thereof and extending substantially the full length thereof. A pair of insulators 69 and 70 are trapped respectively between the insulator 67 and the extreme left-hand end portion of the bus bar 62 and between the insulator 68 and the extreme left-hand end portion of the bus bar 64. In a manner more fully disclosed in U.S. Patent No. 3,189,680, the left-hand portions of the bus bars 62, 63, and 64, the joint covers 65 and 66, and the insulators 67, 68, 69, and 70 are slotted to receive the bolt 22 when the duct section 20 is connected to the duct section 21 as shown in FIGS. 1, 5, and 6. A tie channel 72 (FIGS. 1, 2, 6, and 9) is secured to the lower portions of the duct sections 20 and 21 when they are connected, and as indicated in FIG. 9, an identical tie channel 73 is secured to the upper portions of the duct sections 20 and 21 when no power tap-off device 24 is installed in the left-hand end portion of the duct section 20.

A bolt 74 provided with a nut 75 and an insulating sleeve 76 extends transversely through the left-hand end portion of the duct section 20. The bolt 74 is spaced inwardly longitudinally of the duct section 20 from the portions of the bus bars 62, 63, and 64 which respectively engage the bus bars 42, 43, and 44 of the duct section 21 when the duct sections 20 and 21 are connected. However, the bolt 74 is nevertheless still disposed in the offset portions of the bus bars 62 and 64.

A pair of insulators 79 and 80 are provided inwardly of the insulators 69 and 70 longitudinally of the duct section 20, are generally centered on the bolt 74, and are trapped respectively between the insulator 67 and the bus bar 62, and between the insulator 68 and the bus bar 64. Further, a pair of insulators 81 and 82 are provided in general alignment with the insulators 79 and 80 and are disposed respectively between the bus bar 62 and 63 and between the bus bars 63 and 64. Four spacers 84 are also provided, two spacers 84 being disposed in engagement respectively with opposite sides of the insulator 81 and two spacers 84 being disposed in engagement respectively with opposite sides of the insulator 82, as best shown in FIG. 9. A pair of spring washers 85 and 86 are disposed on the bolt 74 respectively on the outer sides of the joint covers 65 and 66.

When the feeder bus duct sections 20 and 21 have been installed in an electric power distribution system without the power tap-off device 24 and it is later decided to install the device 24, the tie channel 73 is removed from the upper portions of the duct sections 20 and 21, and the bolt 74, sleeve 76, insulators 81 and 82, and spacers 84 are removed from the left-hand end portion of the duct section 20. The device 24 is then plugged in as shown in FIG. 2, and the bolt 74, nut 75, sleeve 76, and spring washers 85 and 86 are replaced. The opposite end portions of the brackets 30 and 31 of the device 24 are then secured respectively to the upper housing portions of the duct sections 20 and 21 by means of a plurality of screws 88 (FIGS. 1 and 5). Preferably, the exposed end portions of the tap-off bus bars 26, 27, and 28 are shielded by a box 89 made up of suitable panels secured together and including a bottom panel 90 secured to the duct sections 20 and 21 by a plurality of screws 92 as well as by the screws 88. The bottom panel 90 is braced by a pair of spaced angle brackets 93 and 94 between which the upper housing portions of the duct sections 20 and 21 are received.

We claim:
1. A feeder bus duct section comprising three elongated flat bus bars of equal thickness disposed in flatwise stacked relationship to each other, each of the bus bars for the greater portion of its length and excepting only opposite ends portions thereof being spaced from an adjacent one of the bus bars a distance less than the thickness of one of the bus bars, each of the outer two of the bus bars having an outwardly offset end portion adjacent the same end of the duct section, the extreme outer end portions of the offset end portions of the outer two bus bars and the corresponding extreme outer end portion of an intermediate one of the bus bars being interleavable with the end opposite portions of the bus bars of a like bus duct section in longitudinal alignment therewith and being electrically connectible thereto respectively in face-to-face engagement, and said offset end portions of the outer two bus bars having a length sufficient to define contact portions inwardly of said extreme outer end portions of said offset end portions long enough to accommodate spaced protruding bus extensions of a power tap-off device, characterized in that the improvement comprises aligned openings in the respective bus bars at said contact portions, a removable insulated bolt extending through said openings, and a pair of insulators surrounding said bolt and disposed respectively between the two outer bus bars and the intermediate bus bar, said insulators being removable with said bolt to permit spaced protruding bus extensions of a power tap-off device to be interleaved with and respectively connected to said bus bars at the contact portions thereof.

2. A bus duct comprising a pair of separate longitudinally-aligned sections of bus duct electrically and mechanically interconnected by a joint therebetween, each of said sections including three flat elongated closely-spaced bus bars of substantially the same thickness disposed for the greater portion of their length in flatwise stacked relationship to each other, the outer two bus bars of each section at the adjacent ends of the sections being oppositely and outwardly offset, the offset portions of the two outer bus bars of one section being longer than the offset portions of the bus bars of the other section, the intermediate bus bar of each section extending to the end of the offset portions of its associated outer two bus bars, the bus bars at the adjacent ends of the sections being interleaved with each other with the corresponding bus bars of the two sections electrically inter-engaged in face-to-face contact respectively at the extreme outer end portions of the bus bars of said one section, whereby offset portions of the outer two bus bars of said one section extend longitudinally inwardly of the areas of face-to-face contact, and first insulating means disposed on opposite sides of the two intermediate bus bars between the two intermediate bus bars and the four outer bus bars at the interleaved portions, characterized in that the improvement comprises second insulating means disposed on opposite sides of the intermediate bus bar between the intermediate bus bar and the two outer bus bars of said one section inwardly of the areas of face-to-face contact, said separate insulating means being removable to permit interleaving of bus bar extensions of a power tap-off device with the bus bars of said one section.

3. A bus duct as claimed in claim 2 wherein aligned openings extend through the respective bus bars and the first insulating means at said interleaved portions, and an insulated bolt extends through said aligned openings to secure the bus bars in said face-to-face contact.

4. A bus duct as claimed in claim 3 wherein said aligned openings in the respective bus bars of said one section are slots opening at the outer end faces of the respective bus bars.

5. A bus duct as claimed in claim 4 wherein aligned openings extend through the respective bus bars and the separate insulating means, and an insulated bolt extends through said openings, the bolt being removable to permit said separate insulating means to be removed.

6. A bus duct as claimed in claim 2 wherein a power tap-off device comprising two outer bus bar extensions and a center bus bar extension is provided, said extensions are in flatwise spaced relationship to each other and interleaved with the bus bars of said one section inwardly of said areas of face-to-face contact, said two outer bus extensions being electrically engaged in face-to-face relation respectively with the inner surfaces of two outer bus bars of said one section, said center bus extension being divided longitudinally to form two separate end portions defining a space therebetween, and said intermediate bus bar of said one section being received in said space in electrical contact with the center bus extension.

References Cited
UNITED STATES PATENTS

| | | | |
|---|---|---|---|
| 2,966,542 | 12/1960 | Shields | 174—72 X |
| 3,004,097 | 10/1961 | Johnston et al. | 174—88 |
| 3,187,086 | 6/1965 | Moodie et al. | 174—68 |
| 3,189,680 | 6/1965 | Stanback | 174—68 |

LARAMIE E. ASKIN, *Primary Examiner.*